O. B. RONEY.
APPARATUS FOR CUTTING SHEET MATERIAL.
APPLICATION FILED AUG. 6, 1915.
1,196,985.
Patented Sept. 5, 1916.
2 SHEETS—SHEET 1.
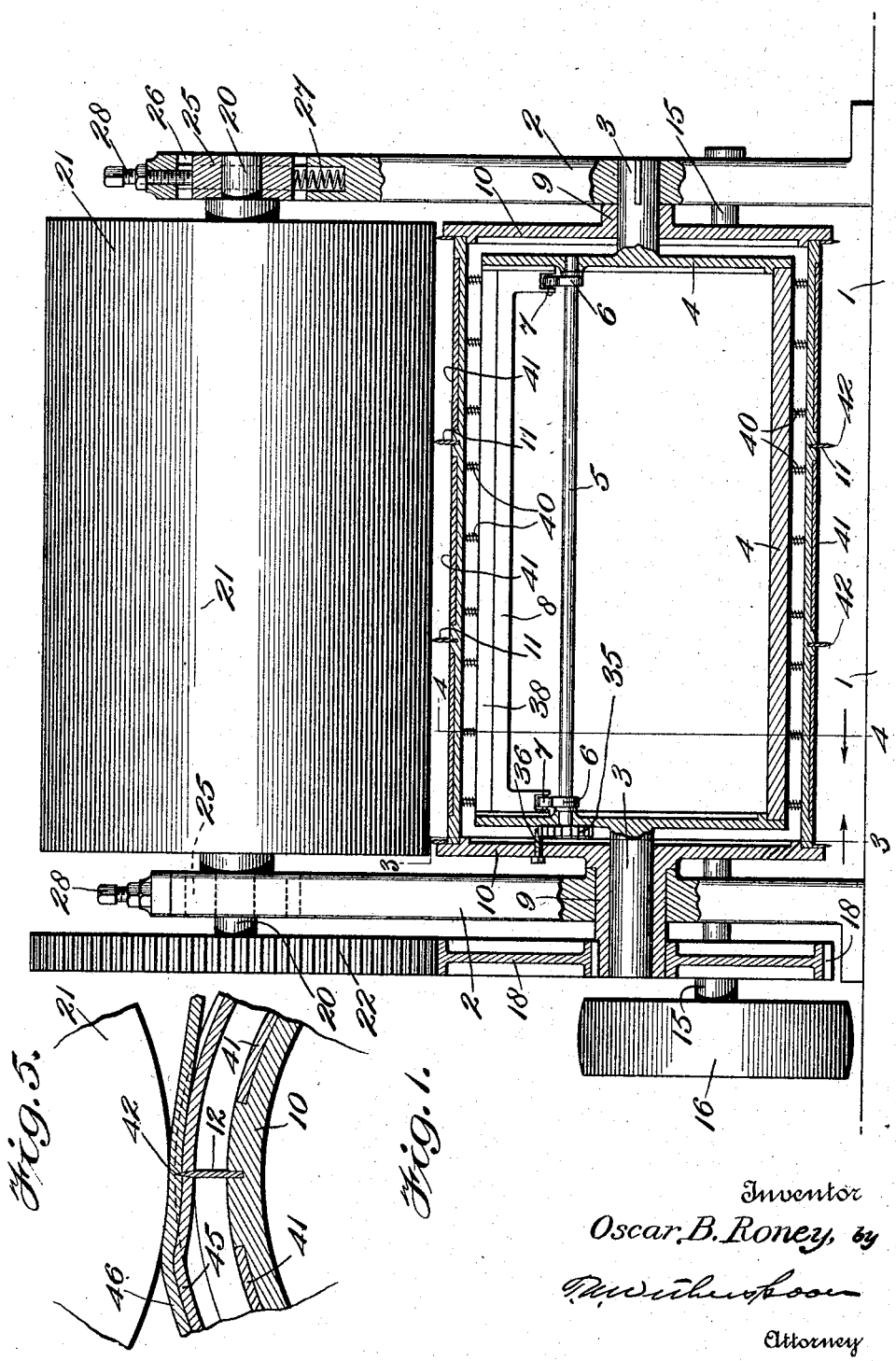
Inventor
Oscar B. Roney, by
Attorney O. B. RONEY.
APPARATUS FOR CUTTING SHEET MATERIAL.
APPLICATION FILED AUG. 6, 1915.
1,196,985.
Patented Sept. 5, 1916.
2 SHEETS—SHEET 2.
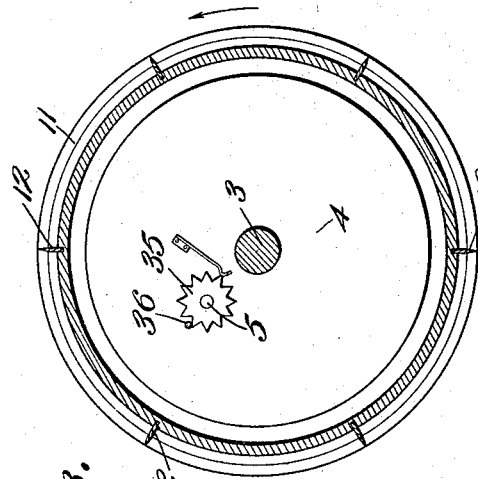
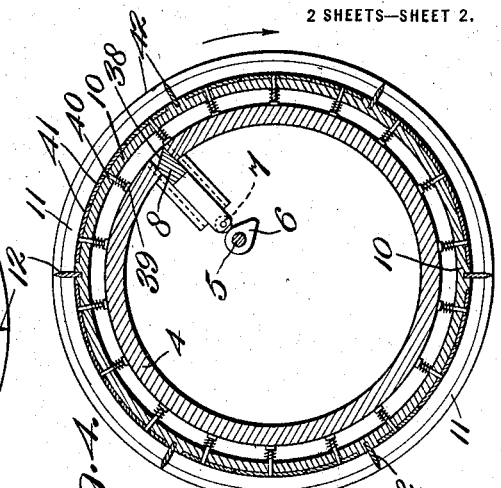
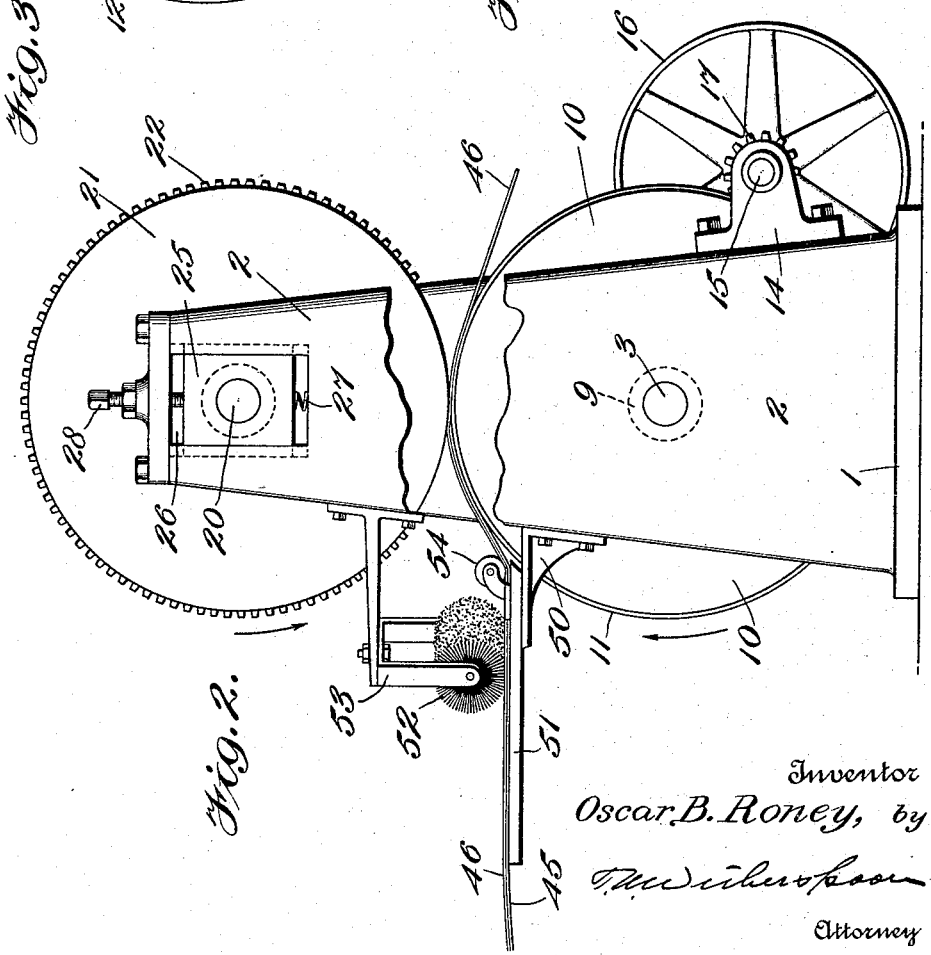
Inventor
Oscar B. Roney, by
Attorney

UNITED STATES PATENT OFFICE.

OSCAR B. RONEY, OF OLNEY, ILLINOIS.

APPARATUS FOR CUTTING SHEET MATERIAL.

1,196,985.  Specification of Letters Patent.  Patented Sept. 5, 1916.

Application filed August 6, 1915. Serial No. 43,964.

*To all whom it may concern:*

Be it known that I, OSCAR B. RONEY, a citizen of the United States, residing at Olney, in the county of Richland and State of Illinois, have invented certain new and useful Improvements in Apparatus for Cutting Sheet Material; and I do hereby declare the following to be a full, clear, and exact description of the invention, such as will enable others skilled in the art to which it appertains to make and use the same.

This invention relates to an apparatus for cutting patterns from sheet material, and has for its object to provide a machine which will be comparatively inexpensive to manufacture and more efficient in action than those heretofore proposed.

With these and other objects in view, the invention consists in the novel details of construction and combinations of parts more fully hereinafter disclosed, and particularly pointed out in the claims.

Referring to the accompanying drawings forming a part of this specification, in which like numerals designate like parts in all the views—Figure 1 is a diagrammatic sectional view of the machine built in accordance with my invention; Fig. 2 is an end elevational view partly broken away of the parts shown in Fig. 1; Fig. 3 is a cross sectional view taken on the line 3—3 of Fig. 1, looking in the direction of the arrow; Fig. 4 is a view similar to Fig. 3 taken on the line 4—4 of Fig. 1 and looking in the direction of the arrow; and Fig. 5 is an enlarged diagrammatic sectional view showing the method of cutting patterns with this machine.

1 indicates any suitable base or support, 2 suitable standards rising therefrom, 3 short stub shafts fixed in said standards and carrying the stationary drum or cylinder 4. Rotatably mounted in the ends of the drum 4 is the shaft 5 provided with the pair of cams 6 adapted to take against the rollers 7, carried by the ejecting bar 8, adapted to move in and out of slots with which the wall of the drum 4 is provided.

9 represents the hollow shafts or journals of an outer drum 10 which incloses the drum 4, one of which journals 9 is mounted in one of the stationary standards 2 and both of which surround the stationary short shafts 3 as will be readily understood. Around the circumference of the drum 10 are arranged a plurality of cutting knives or dies 11, and at an angle to the said knives 11 are arranged a second set of knives 12, the two sets of knives 11 and 12 forming any desired and suitably shaped pattern or die.

14 represents brackets attached to the supports 2, and 15 a shaft mounted on said brackets, carrying the power pulley 16 and the gear or pinion 17 meshing with the gear 18, meshing with the gear 22, mounted on the shaft 20 and carrying the drum 21, all as will be clear from the drawings.

The shaft 20 is mounted in the movable blocks 25, adapted to slide up and down the ways 26 with which the standards or supports 2 are provided, and said blocks are normally supported by the springs 27 as shown. Screws or other adjusting means 28 are adapted to adjust the blocks 25 against the action of the springs 27, and to thereby bring the lower surface of the cylinder or drum 21 within a very small predetermined fraction of an inch from the cutting knives 11 and 12, as will be more fully disclosed below.

To one end of the shaft 5 is secured the toothed wheel 35 preferably provided with twelve teeth, and rigid with one end of the drum 10 and projecting into the path of said teeth is the pin or other means 36, adapted to turn the wheel 35 one tooth for each revolution of the drum 10. The turning of the wheel 35, of course, turns the shaft 5 and with it the cams 6, so that when the drum 10 has made twelve revolutions the said cams 6 will have made one complete revolution, and the said ejector bar 8 will have moved up and down in its slot as will be clear from Figs. 1, 3 and 4.

When the upper beveled edges 38 of the ejector bar has been thus moved beyond the outer surface of the drum 4 and into the path of the spring pressed inner ends 39 of the ejector rods 40, said ejector rods will as the drum 10 revolves, be forced radially outward and will carry with them the ejector, or follower strips 41, thereby forcing out of the space between the knives 11 and 12 any pattern or other shapes, that may have been cut by the operation of the machine to be described below. In order to prevent the hard metal surface of the drum 21 from contacting with the outer sharpened edges 42 of the knives 11 and 12, and the said cylinder 21 is carefully adjusted by means of the screws 28 so that its outer surface will approach to within a distance of the cutting edges 42, less than the thickness of two sheets of material, but not sufficiently close to contact with said edges as will now be more fully disclosed.

The sheet material 45 such as cloth, leather or rubber to be cut, is fed over the surface of the knives 11 and 12, and in order to protect the edges 42 of said knives while at the same time permitting the pressure from the cylinder to cause said edges 42 to pass entirely through the sheet 45, I feed over the said edges 42 along with said sheet 45, a protecting sheet of paper 46, or other suitable material, and I adjust the distance between the cylinder 21 and the edges 42 so that the said edges 42 will pass entirely through the sheet 45, but will only pass partially through the sheet 46 as is best illustrated in Fig. 5.

In order to facilitate the feeding of the sheet material I provide on the standards 2 the brackets 50, and secure to said brackets 50, the feed table 51 over which the sheets 45 and 46 may be passed as illustrated in Fig. 2. A pressure roller 52 supported, as by the brackets 53, is preferably mounted so as to contact with the superposed sheet 46, and said roller 52 is also preferably so mounted that it presses at an angle to the line of travel of said sheet, and thereby more effectually smooths out the edges of the same. The said sheets 45 and 46 are further preferably caused to pass under the roller 54 just before the cutting dies or knives are reached, so as to hold the two sheets in proper relation to each other and to said knives.

The operation of the invention will be clear from the foregoing, but may be briefly summarized as follows: The dies or knives 11, 12 being suitably shaped to cut out the desired pattern, the sheet material 45 such as kid, leather, cloth, etc., is brought to the table 51, whereupon the protecting sheet 46 is laid thereover, and the two sheets fed to the machine as illustrated in Fig. 2. The cylinder 21 being carefully adjusted by the means 28 so that the distance between the lower surface of said cylinder and the upper edge 42 of the knives will be less than the combined thicknesses of the sheets 45 and 46, and also preferably less than the thickness of the sheet 46, upon rotating the drums 10 and 21, the said knives 11 and 12 will enter the said sheets 45 and 46, cutting entirely through the sheet 45 and partially through the sheet 46 without the said edges 42 coming in contact with the said roller 21. The pattern thus produced from the sheet 45 will occupy the space between the knives 11 and 12 and immediately above the follower plates or strips 41. The patterns will be thus cut from the sheet 45 as long as the two sheets 45 and 46 are fed to the machine and when a predetermined number of patterns, twelve in this instance, have been thus cut they will be ejected by the follower plates 41 from the space between the knives through the operation of the cams 6 and the ejector bar 8, as above described.

It will be thus seen that the patterns cut from single sheets are thus readily produced, and in a very rapid manner. It is well known to those skilled in the art that when a knife or die is driven through a plurality of superposed sheets to cut out simultaneously a plurality of patterns, that the upper and lower patterns are of necessity of a different size, and other objections exist to patterns thus cut out. On the other hand, when single patterns are cut from single thicknesses by hand as is now commonly done, the method is slow and expensive. The invention above disclosed not only avoids these objections, but since the roller or cylinder 21 is not covered with any soft material to protect the edges of the knives, the expense and delay incident to renewing such soft material is done away with. In other words by the simple expedient of feeding a protecting sheet 46 of paper or other suitable material through the machine along with the material 45 to be cut, I avoid the many objections which have heretofore existed in pattern cutting machines.

The character of the protecting sheet 46 is of importance in that if the material is too soft, the material of the sheet 45 will be forced thereinto by the edges 42 of the knives and a clean and accurately cut pattern will not result. On the other hand, if the material of the sheet 46 is too hard the knives 11 and 12 will be unnecessarily dulled.

I have found in practice that ordinary paper calendered on both sides and of a quality that is commonly used for file wrappers, large Manila envelops, etc., answers the purpose admirably in that it is both inexpensive and very firm to the edges 42 while it does not unduly dull said edges.

The knives or dies 11 and 12 are removably attached to the cylinder 10 by means not illustrated.

It is obvious that those skilled in the art may vary the details of construction, without departing from the spirit of the invention and therefore I do not wish to be limited to the above disclosure except as may be required by the claims.

What I claim is:

1. In a machine for cutting patterns from sheet material the combination of a suitable die; rotating means on which said die is mounted; a pressure means adapted to coact with said die; means to adjust the surface of said pressure means to a predetermined distance from the cutting edges of said die; a non-rotating, radially reciprocating bar located inside said rotating means; cams for reciprocating said bar; and pattern ejecting means associated with said die adapted to be actuated by said bar, substantially as described.

2. In a machine for cutting patterns from sheet material the combination of a suitable die; rotating means on which said die is mounted; a pressure means adapted to co-act with said die; means to adjust the surface of said pressure means to a predetermined distance from the cutting edges of said die; a protecting sheet adapted to be fed to said die along with the material to be cut, and a non-rotating, radially reciprocating ejector bar located inside said rotating means for ejecting the cut-out patterns, substantially as described.

3. In a machine for cutting patterns from sheet material the combination of a suitable die; a rotatable drum on which said die is mounted; a non-rotating reciprocating ejector bar located in said drum; pattern-ejecting means located outside of said drum adapted to be operated by said bar; a rotating pressure cylinder adapted to press the material to be cut on to said die; and means for adjusting the pressure surface of said cylinder to a distance from the cutting edges of said die less than the thickness of the material to be cut, substantially as described.

In testimony whereof I affix my signature, in presence of two witnesses.

OSCAR B. RONEY.

Witnesses:
L. G. BARNARD,
O. G. RONEY.

Copies of this patent may be obtained for five cents each, by addressing the "Commissioner of Patents, Washington, D. C."